United States Patent
Hong et al.

(10) Patent No.: US 8,967,822 B2
(45) Date of Patent: Mar. 3, 2015

(54) BACKLIGHT ASSEMBLY AND LIQUID CRYSTAL DISPLAY MODULE USING THE SAME

(75) Inventors: Hee-Jung Hong, Guro-gu (KR); Eui-Yeol Oh, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 822 days.

(21) Appl. No.: 11/511,423

(22) Filed: Aug. 29, 2006

(65) Prior Publication Data

US 2007/0153515 A1 Jul. 5, 2007

(30) Foreign Application Priority Data

Dec. 29, 2005 (KR) .............................. 2005-0133532

(51) Int. Cl.
*G09F 13/04* (2006.01)
*G02F 1/1335* (2006.01)

(52) U.S. Cl.
CPC .... *G02F 1/133603* (2013.01); *G02F 1/133608* (2013.01); *G02F 2001/133612* (2013.01)
USPC ......................................... 362/97.3; 362/97.1

(58) Field of Classification Search
USPC ........................ 362/237, 27, 97.1–97.4, 241
See application file for complete search history.

(56) References Cited

U.S. PATENT DOCUMENTS

| | | | | |
|---|---|---|---|---|
| 5,680,183 A * | 10/1997 | Sasuga et al. | .................... | 349/58 |
| 5,857,767 A * | 1/1999 | Hochstein | .................... | 362/294 |
| 6,517,213 B1 * | 2/2003 | Fujita et al. | .................... | 362/84 |
| 6,789,921 B1 * | 9/2004 | Deloy et al. | .................... | 362/97.3 |
| 6,932,495 B2 * | 8/2005 | Sloan et al. | .................... | 362/294 |
| 6,964,489 B2 * | 11/2005 | Blume et al. | .................... | 362/27 |
| 6,974,229 B2 * | 12/2005 | West et al. | .................... | 362/227 |
| 7,072,096 B2 * | 7/2006 | Holman et al. | .................... | 359/298 |
| 2006/0077692 A1 * | 4/2006 | Noh et al. | .................... | 362/625 |
| 2006/0202210 A1 * | 9/2006 | Mok et al. | .................... | 257/79 |
| 2006/0285311 A1 * | 12/2006 | Chang et al. | .................... | 362/97 |
| 2007/0002554 A1 * | 1/2007 | Lim | .................... | 362/97 |
| 2007/0070625 A1 * | 3/2007 | Bang | .................... | 362/240 |

FOREIGN PATENT DOCUMENTS

| | | |
|---|---|---|
| JP | 2002-268572 | 9/2002 |
| JP | 2004-342587 | 12/2004 |
| JP | 2005-317480 | 11/2005 |
| JP | 2005-339822 | 12/2005 |
| JP | 2005-339881 | 12/2005 |
| JP | 2007-157354 | 6/2007 |
| JP | 2007-173787 | 7/2007 |
| KR | 10-2005-0131721 | * 12/2005 |

* cited by examiner

*Primary Examiner* — Evan Dzierzynski
(74) *Attorney, Agent, or Firm* — Morgan, Lewis & Bockius LLP

(57) ABSTRACT

A backlight assembly includes at least one backlight sub-unit, the backlight sub-unit including a light emitting diode (LED) unit that includes at least one LED that emit a predetermined color arranged in a predetermined pattern and a sidewall surrounding the LED unit.

35 Claims, 13 Drawing Sheets

BACKLIGHT ASSEMBLY AND LIQUID CRYSTAL DISPLAY MODULE USING THE SAME

The present invention claims the benefit of Korean Patent Application No. 2005-0133532, filed in Korea on Dec. 29, 2005, which is hereby incorporated by reference.

BACKGROUND OF THE INVENTION

1. Field of the Invention

The present invention relates to a backlight assembly, and more particularly, a backlight assembly including a plurality of light emitting diodes (LEDs) and a liquid crystal display (LCD) module using the backlight assembly.

2. Discussion of the Related Art

Flat panel display (FPD) devices that have a relatively light weight, a thin profile, and low power consumption characteristics are being developed and commonly used as a substitute for cathode ray tube (CRT) devices. Generally, display devices are classified according to their ability for self-emission as emissive display devices and non-emissive display devices. Emissive display devices display images by taking advantage of their ability to self-emit light. By contrast, the non-emissive display devices require a light source since they do not emit light by themselves. For example, plasma display panel (PDP) devices, field emission display (FED) devices, and electroluminescent display (ELD) devices are commonly classified as emissive display devices. Liquid crystal display (LCD) devices are classified as non-emissive display devices. LCDs are commonly used in notebook and desktop computers because of their high resolution, ability to display colored images, and high quality image display.

An LCD module includes an LCD panel for displaying images and a backlight unit for supplying light to the LCD panel. The LCD panel typically includes two substrates facing and spaced apart from each other, and a liquid crystal material interposed therebetween. Liquid crystal molecules of the liquid crystal material have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electrodes to change transmittance of the LCD panel according to polarization properties of the liquid crystal material. However, since the LCD panel is a non-emissive-type display device, an additional light source is required.

Typically, a backlight unit is disposed under the LCD panel in order for the LCD device to display images using light produced by the backlight unit. In general, backlight units may be classified into two types according to a placement of the light source, such as an edge-type backlight unit and a direct-type backlight unit. As display areas of the LCD devices become larger, direct-type backlight units that include a plurality of light sources have become more commonly used in order to provide increased brightness.

Generally, discharge lamps, such as cold cathode fluorescent lamps (CCFLs) or external electrode fluorescent lamps (EEFLs), are used as a light source for the backlight unit. More recently, light emitting diodes (LEDs) have gradually been used more often as the light source of the backlight unit to improve color reproducibility and increase brightness of the display.

FIG. 1 is an exploded view of an LCD module with a backlight assembly according to the related art. An LCD panel 10 and a backlight unit 20 are assembled with mechanical structural elements that protect these components and to prevent light leakage from the assembled LCD module 1. Generally, the LCD panel 10, the backlight unit 20, and several mechanical elements taken together may be referred to as an LCD module 1.

The LCD module 1 includes an LCD panel 10, a backlight unit 20 located under the LCD panel 10, and a main frame 40, which is preferably square or rectangular and surrounds the edges of the LCD panel 10 and the backlight unit 20. Additionally, a bottom frame 50 is provided on a bottom surface of the backlight unit 20 to provide structural support and to prevent light leakage from the unit when combined with the main frame 40. Furthermore, a top frame 60 surrounds a front edge of the LCD panel 10 such that the LCD module 1 is complete when the main frame 40, the bottom frame 50, and the top frame 60 are combined.

In addition, the backlight unit 20 further includes a plurality of printed circuit boards (PCBs) 22 that are disposed along an inner surface of the bottom frame 50, a plurality of light emitting diodes (LEDs) 24 packaged on the PCBs 22, a reflective sheet 26 having a plurality of through holes 28 corresponding to the plurality of LEDs 24 and contacting the PCBs 22 and the bottom frame 50 except at the LEDs 24, and a plurality of optical sheets 32 covering the plurality of LEDs 24.

Meanwhile, light from the plurality of LEDs 24 is reflected by the reflective sheet 26, and then the reflected light is altered through the plurality of optical sheets 32. The altered light is transferred to the LCD panel 10, which allows the LCD panel 10 to display a bright image. For example, in order to emit a white light, the plurality of the LEDs 24 may be driven by mixing light from red (R), green (G), and blue (B) LEDs emitting red, green, and blue colors, respectively, arranged in a predetermined order. Although not shown, the optical sheet 32 may include a diffuser sheet and a prism sheet.

FIG. 2 is a schematic cross-sectional view taken along line "II-II" of FIG. 1. As shown in FIG. 2, in the backlight assembly 20, light (not shown) from the LEDs 24, i.e., light directly emitted and reflected by the reflective sheet 26, is passed through the optical sheet 32 and enters the liquid crystal panel 10 (of FIG. 1) as a light source.

This backlight assembly 20 has several disadvantages. Generally, the LEDs 24 are arranged in a row on each of the PCBs 22. Accordingly, when some of the LEDs 24 become damaged, the whole PCB 22 having the damaged LEDs 24 must be replaced regardless of the number of the LEDs 24 actually damaged. In some cases, during the repair of damaged PCBs 22, normally functioning LEDs 24 may become damaged. Therefore, according to the backlight assembly of the related art, cost and time for repairing the backlight assembly may be increased.

Further, it is impossible to change the positions of the LEDs 24 once they are set on the PCBs 22. Consequently, the user cannot replace the LEDs 24 with different LEDs if the brightness of the backlight assembly 20 is not satisfactory.

Additionally, in order to have significantly high brightness and contrast in a specific portion of the liquid crystal panel 10 (of FIG. 1), such as an explosion scene in a movie, for example, the backlight assembly 20 should be driven by a division driving method. However, it is difficult to drive the backlight assembly 20 according to the related art using the division driving method.

Moreover, the backlight assembly 20 should have enough space between the LEDs 24 and the optical sheet 32 to facilitate adequate color mixing and to increase the divergence angle (not shown) of the LEDs 24. Further, various diffusing elements, such as a diffuser member (not shown), may be interposed between the LEDs 24 and the optical sheet 32 to solve some of the problems of the related art. However, even if the backlight assembly 20 including the diffuser member for selected LEDs 24 is driven by the division driving method the backlight assembly 20 still suffers from weak brightness at the boundary.

SUMMARY OF THE INVENTION

Accordingly, the present invention is directed to a backlight assembly and a liquid crystal display (LCD) module using the backlight assembly that substantially obviate one or more of the problems due to limitations and disadvantages of the related art.

An object of the present invention is to provide a backlight assembly and an LCD module that reduce cost and time for repairing light elements thereof.

Another object of the present invention is to provide a backlight assembly and an LCD module that can be driven using a division driving method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight assembly includes at least one backlight sub-unit, the backlight sub-unit including a light emitting diode (LED) unit that includes at least one LED that emit a predetermined color arranged in a predetermined pattern and a sidewall surrounding the LED unit.

In another aspect, a backlight assembly includes a plurality of backlight sub-units, each backlight sub-unit including a light emitting diode (LED) unit, the LED unit including at least one LED emitting a predetermined color and a connector unit, and a backlight driving circuit connected to at least one of the backlight sub-unit.

In yet another aspect, a liquid crystal display module includes a top frame, a bottom frame, a backlight assembly including a plurality of backlight sub-units arranged in a matrix shape, each of the plurality of backlight sub-units including a light emitting diode (LED) unit that includes at least one LED that emits a predetermined color arranged in a predetermined pattern, and a sidewall surrounding the LED unit, a liquid crystal panel, a main frame interposed between the backlight assembly and the liquid crystal panel, and a backlight driving circuit electrically connected to the plurality of the LED units.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
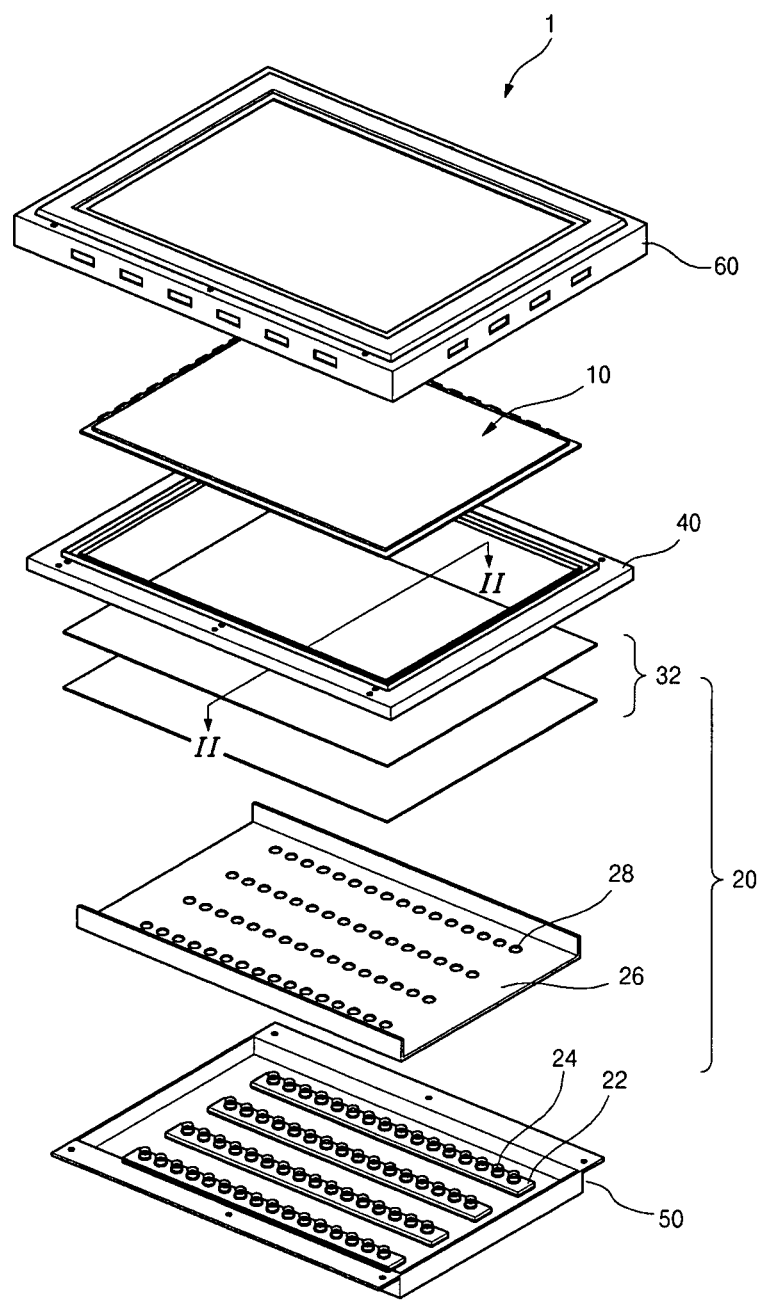
FIG. 1 is an exploded view of an LCD module using a backlight assembly according to the related art.
Figure 2:
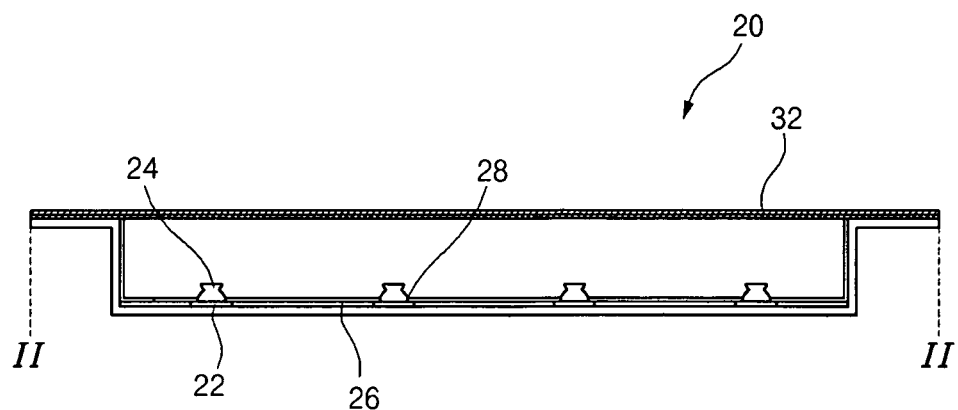
FIG. 2 is a schematic cross-sectional view taken along line "II-II" of FIG. 1.
Figure 3:
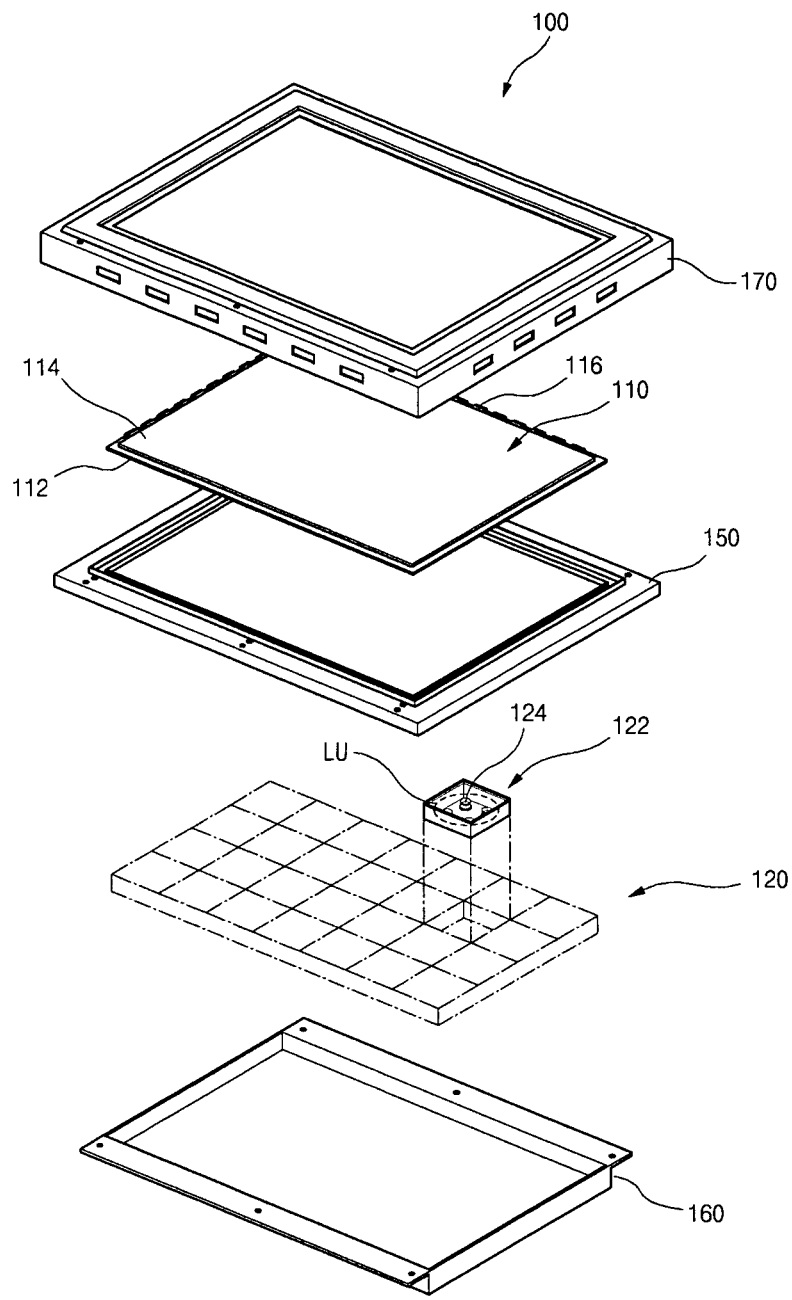
FIG. 3 is an exploded view of an LCD module using a backlight assembly according to an exemplary embodiment of the present invention.

FIG. 3 is an exploded view of a liquid crystal display (LCD) module with a backlight assembly according to an embodiment of the present invention. As shown in FIG. 3, an LCD module 100 includes a liquid crystal panel 110 and a backlight assembly 120 under the liquid crystal panel 110. A main frame 150 surrounds edges of the liquid crystal panel 110 and the backlight assembly 120. For example, the main frame 150 may be made of stainless use steel (SUS) or plastic mold member. A bottom frame 160 covers a backside of the backlight assembly 120 and combines with the main frame 150 to minimize light loss and to maintain the shape of the LCD module 100. Further, a top frame 170 surrounds a front edge of the liquid crystal panel 110 and combines with the bottom frame 160 through the main frame 150. The main frame 150, the bottom frame 160, and the top frame 170 are substantially modularized with respect to each other.

More specifically, the liquid crystal panel 110 includes a first substrate 112, a second substrate 114 facing the first substrate 112, and a liquid crystal layer (not shown) between the first and second substrates 112 and 114. Although not shown, when the liquid crystal panel 110 is an active matrix type model, a plurality of gate lines, a plurality of data lines crossing the plurality of gate lines to define a plurality of pixel region, a thin film transistor at each crossing of the gate lines and the data lines, and a pixel electrode connected to the thin film transistor in each the pixel regions are formed on the first substrate 112. Further, although not shown, red (R), green (G), and blue (B) sub-color filter layers in each the pixel regions and a black matrix boundaries between the R, G, and B sub-color filter layers are formed on the second substrate 114. A common electrode may be formed on the R, G, and B sub-color filter layers and the black matrix.

A driving circuit (not shown) is connected to sides of the liquid crystal panel 110 through a connector 116, such as a flexible printed circuit board (FPCB) or a tape carrier package (TCP). For purposes of example only, FIG. 3 shows a driving circuit substantially bent to be close to a backside of the bottom frame 160 through a modularization process.

Although not shown, the driving circuit includes a gate driving circuit that applies a scanning signal to the gate lines and a data driving circuit that applies a data signal to the data lines. For example, the data driving circuit is adjacent to the gate driving circuit. Specifically, when a thin film transistor is turned ON by the scanning signal from the gate driving circuit, the data signal is transferred to the corresponding pixel electrode through a data line. Therefore, the ON/OFF states of the thin film transistor affect the transmittance of the pixel region by changing the arrangement direction of liquid crystal molecules due to a vertical electric field between the pixel electrode and the common electrode.

As a light source for the liquid crystal panel 110, a backlight assembly 120 is disposed below the liquid crystal panel 110. In particular, the backlight assembly 120 includes a plurality of backlight sub-units, such as light emitting diode (LED) units 122. Each of the backlight sub-units 122 includes a plurality LED units ("LU") that have at least one LED 124 emitting a predetermined color. More particularly, the plurality of backlight sub-units 122 are arranged in a matrix to provide a uniform surface light source.

Figure 4A:
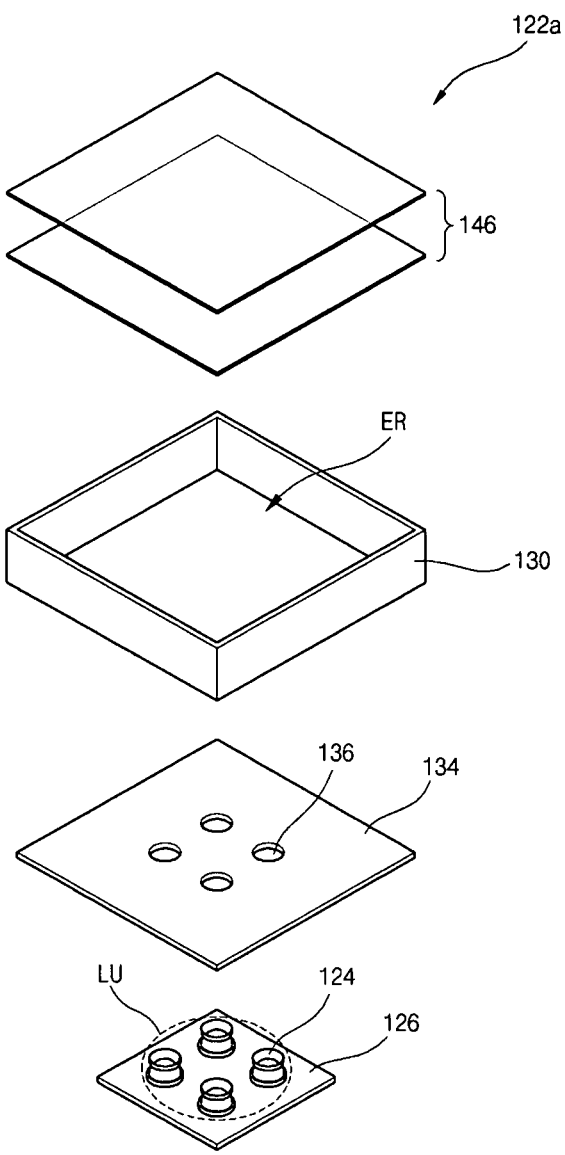
FIGS. 4A and 4B are schematic perspective views of a light emitting diode (LED) unit according to an exemplary embodiment of the present invention.
Figure 4B:
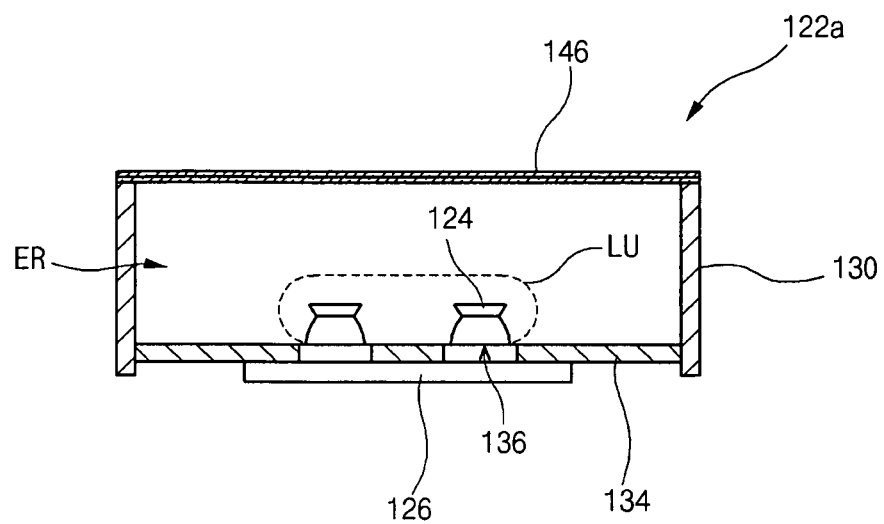

FIGS. 4A and 4B are schematic perspective views showing a backlight assembly with respect to one backlight sub-unit according to an exemplary embodiment of the present invention. FIG. 4A is an exploded view, and FIG. 4B is a cross-sectional view. For convenience, the backlight sub-unit 122 (of FIG. 3) will be referred to as "122a" in FIGS. 4A and 4B and "122b" in FIGS. 5A and 5B to denote various exemplary embodiments according to the present invention.

As shown in FIGS. 4A and 4B, the backlight sub-unit 122a according to one exemplary embodiment of the present invention includes an LED unit ("LU") including at least one LED 124 emitting a predetermined color. For example, the LED unit LU may include four LEDs 124 having a square shape as shown in FIG. 4A. A sidewall 130 surrounds the backlight sub-unit 122a to define an emission region ("ER"), and optical sheet 146 covers the backlight sub-unit 122a. The LEDs 124 emit light substantially toward the liquid crystal panel 110 (of FIG. 3), and the optical sheet 146 covers a portion of the LEDs 124 toward the liquid crystal panel 110. The backlight sub-unit 122a having the LED unit LU is disposed in the emission region ER.

The sidewall 130 is selected from one of a transparent material, an opaque reflective material, and a half-transparent diffusion material and may have four sides generally perpendicular to each other. Specifically, the transparent material for the sidewall 130 may be a transparent plastic having a transmittance of more than about 90 percent, and the half-transparent diffusion material may be a plastic mold substance having a transmittance of about 50 percent to about 90 percent. For example, when polymethyl metahcrylate (PMMA) is molded, aluminum (Al) particle or the like may be added in the PMMA to form the plastic mold substance. The opaque reflective material may be a metallic material having a high surface reflectance, such as Al.

The LEDs 124 in the LED unit LU act as a light source emitting white light. In particular, the LED unit LU may include red (R), green (G), and blue (B) LEDs arranged in a predetermined order, and the colored lights from the LEDs are mixed together to emit the white light. Alternatively, the LED unit LU may include at least one white (W) LED. A reflective sheet 134 is disposed on the printed circuit board (PCB) 126 and has a through-hole 136 to expose each of the LEDs 124. That is, the reflective sheet 134 exposes the LEDs 124 by shielding the PCB 126 for light efficiency. The optical sheet 146 may include a prism sheet and a diffusion sheet such that the optical sheet 146 modifies light from the LEDs 124 into a surface light source. The optical sheet 146 substantially covers a portion of the backlight sub-unit 122a to transmit the light generated therefrom. It is noted that the optical sheets 146 may be a single sheet or a combination of various sheets without departing from the scope of the present invention.

Light from the LEDs 124 is reflected by the reflective sheet 134 or is emitted directly toward the liquid crystal panel 110 (of FIG. 3). Here, the generated light is modified into a surface light source through the optical sheet 146. Accordingly, a plurality of backlight sub-units 122a can provide light uniformly along the entire surface of the liquid crystal panel 110.

In addition, the backlight sub-units 122a may include an additional optical sheet having one body over the optical sheets 146.

Figure 5A:
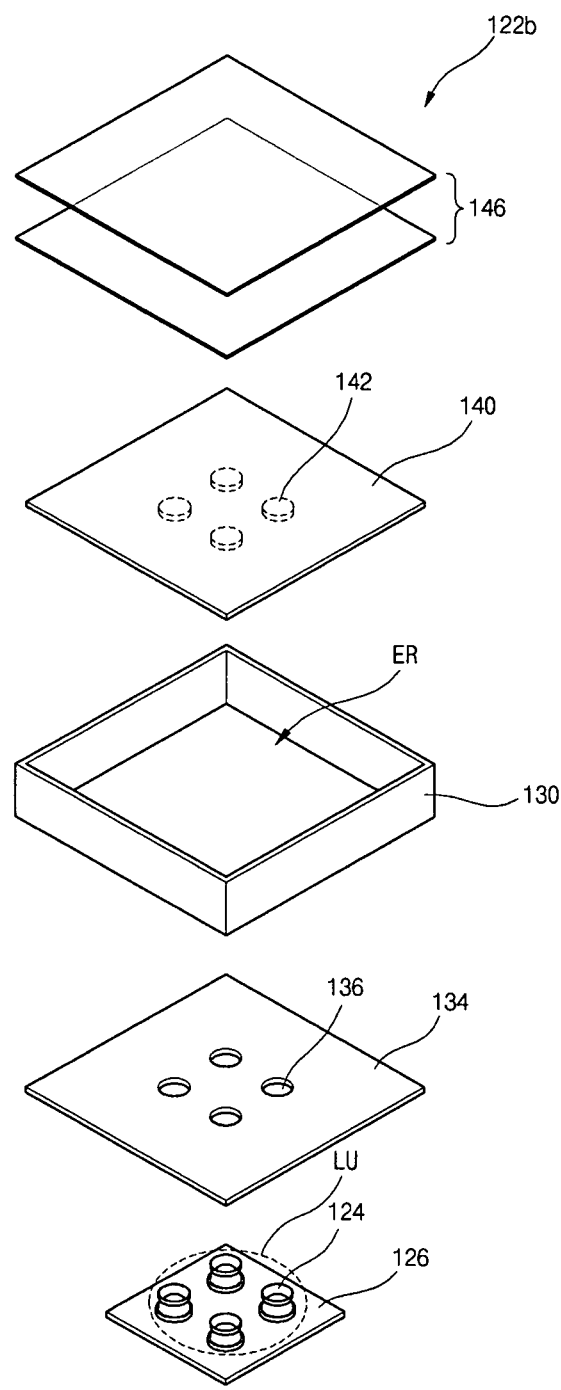
FIGS. 5A and 5B are schematic perspective views of a backlight sub-unit according to another exemplary embodiment of the present invention.
Figure 5B:
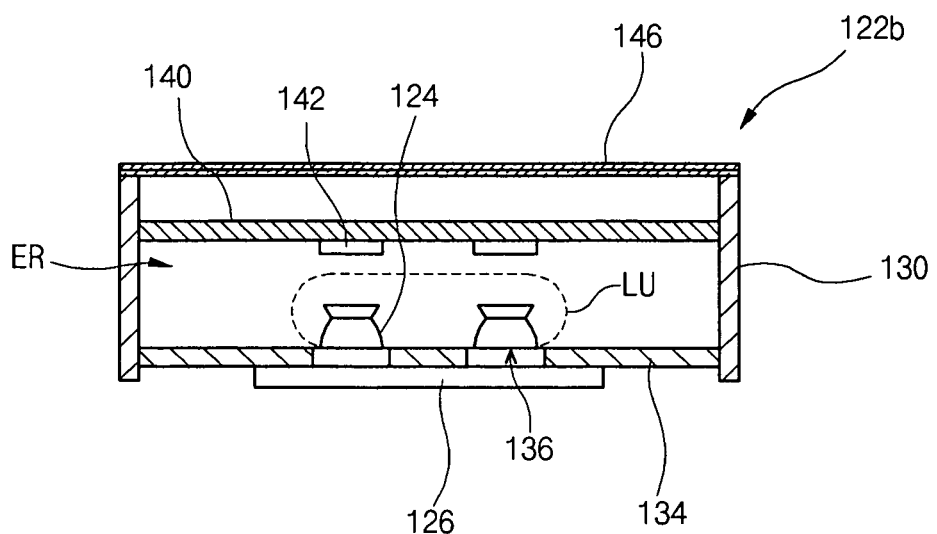

FIGS. 5A and 5B are schematic perspective views showing a backlight assembly with respect to one backlight sub-unit according to another exemplary embodiment of the present invention. FIG. 5A is an exploded view, and FIG. 5B is a cross-sectional view.

As shown in FIGS. 5A and 5B, a transparent window 140 is interposed between the LEDs 124 of the LED unit LU and the optical sheet 146. In addition, diverters 142 are disposed on a surface of the transparent widow 140 facing the LEDs 142 to reflect or to diffuse light from the LEDs 124. In particular, the diverters 142 are formed to generate a more uniform surface light and to improve color mixing by reflecting and diffusing light emitted directly from the LEDs 124. The diverters 142 may include white or silver sheet material similar to that of the reflective sheet 134. Further, the transparent window 140 acts to support the reflective sheet 134 such that the reflective sheet 134 can maintain a predetermined distance with the LEDs 124.

The LEDs 124 of LED unit LU may be arranged in various configurations to emit white (W) light. FIGS. 6A to 6H are schematic plan views showing various arrangement structures of the LED unit LU according to various exemplary embodiments of the present invention. As shown in FIGS. 6A to 6H, the LED unit LU may consist of LEDs 124 emitting light of a predetermined color. The LED unit LU is surrounded by the sidewall 130 in the emission region ER and is exposed by the reflective sheet 134.

Figure 6A:
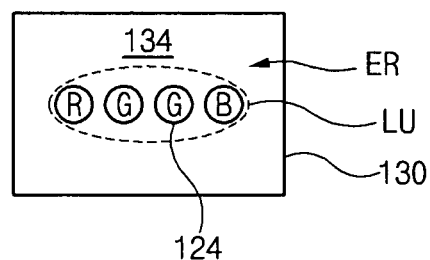
FIGS. 6A to 6H are schematic plan views of various arrangement structures of an LED unit according to an exemplary embodiment of the present invention.
Figure 6B:
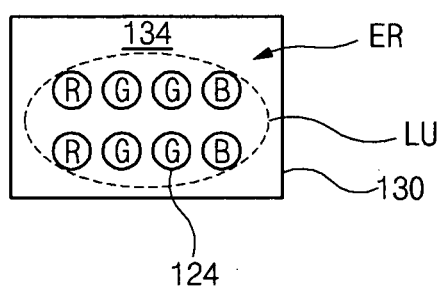
Figure 6C:
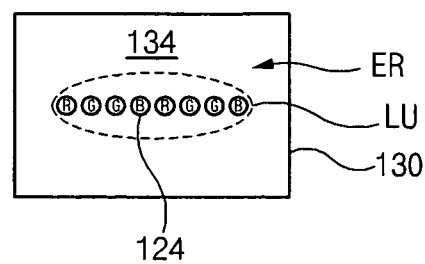
Figure 6D:
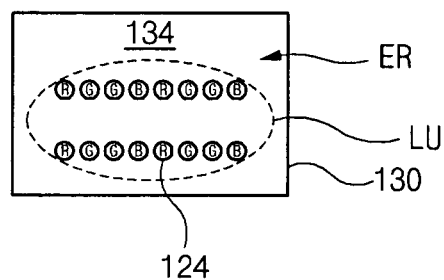
Figure 6E:
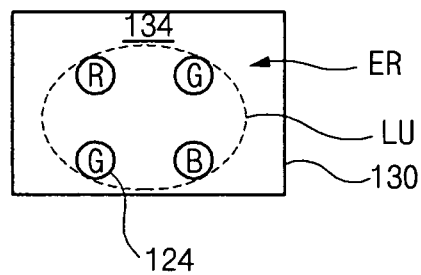
Figure 6F:
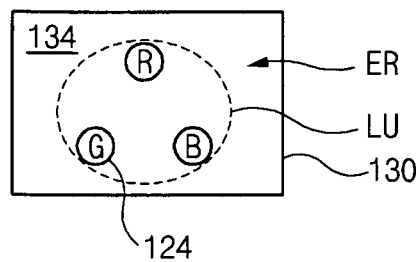
Figure 6G:
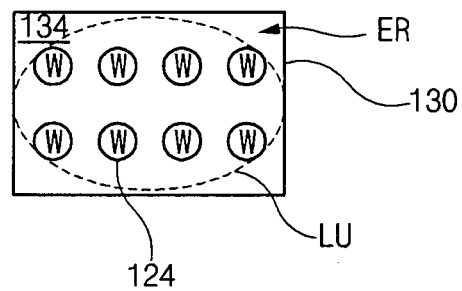
Figure 6H:
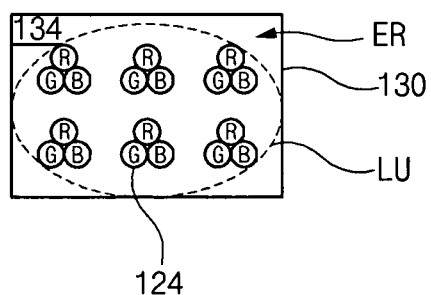

Specifically, the LED unit LU may include LEDs arranged in a row with a color pattern of RGGB (FIG. 6A), LEDs arranged in two rows with each row having a color pattern of RGGB (FIG. 6B), LEDs arranged in a row with a repeating color pattern of RGGB (FIG. 6C), LEDs arranged in two rows with each row having a repeating color pattern of RGGB (FIG. 6D), LEDs arranged in a square shape with a color pattern of RGGB (FIG. 6E), LEDs arranged in a triangle shape with a color pattern of RGB (FIG. 6F), LEDs arranged in two rows with each row having a color pattern of WWWW (FIG. 6G), and LEDs arranged in a cluster on two rows with each cluster having a color pattern of RGB (FIG. 6H). It is to be understood that other color patterns and arrangement configurations may be used without departing from the scope of the present invention.

For example, although not shown, the LED unit LU may include LEDs arranged in a row with a color pattern of RGB or a repetition thereof, such as GRBG, RGGB, and GRBGR. It is important to note that the LED unit LU includes the LEDs 124 in at least one row and each configuration includes at least one set of R, G, and B. For example, the LED unit LU may include LEDs arranged in a triangle shape with a color pattern of RGB, LEDs arranged in a square with a color pattern of GRBG or RGGB, or LEDs arranged in a square with a color pattern of GRBGR disposed at four vertexes and one central portion of the square. Furthermore, white (W) LED may be included along with the RGB LEDs. As stated above, other arrangements may be applied without departing from the scope of the invention.

The backlight sub-units 122 including the LED units LU are controlled by a backlight driving circuit. The backlight driving circuit may be disposed on a rear-side of the bottom frame 160 to minimize a packaging size. Each of the backlight sub-units 122 are electrically connected to the backlight driving circuit.

Figure 7:
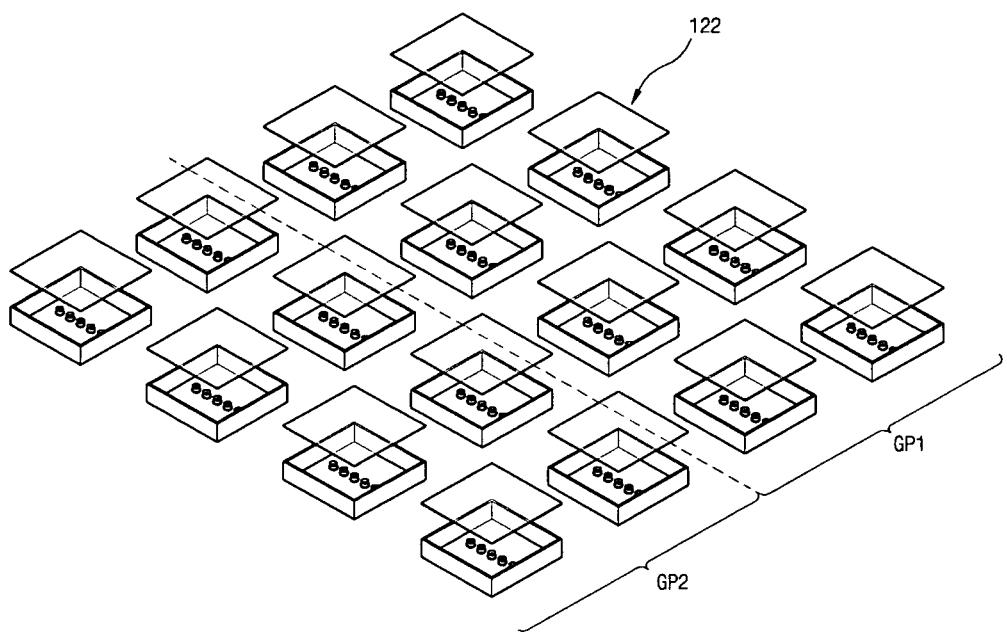
FIG. 7 is a schematic plan view of a plurality of backlight sub-units according to an exemplary embodiment of the present invention.

FIG. 7 is a schematic plan view of a plurality of backlight sub-units according to an exemplary embodiment of the present invention. As shown in FIG. 7, the backlight sub-units 122 are arranged in a matrix. For example, the backlight sub-units 122 may be divided into at least two groups GP1 and GP2, and each group of backlight sub-units 122 may be driven by a common signal.

Figure 8A:
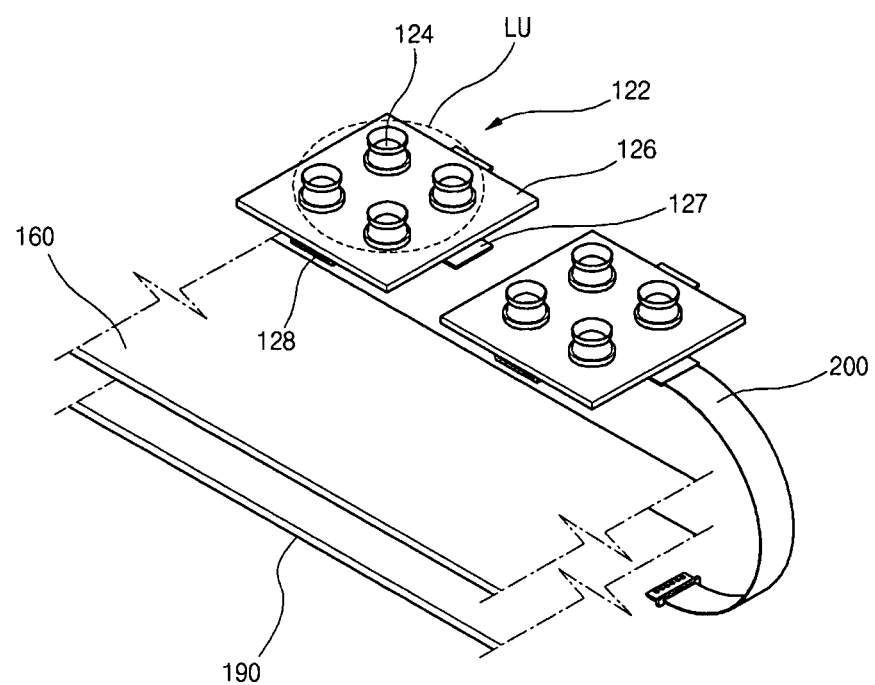
FIGS. 8A and 8B are perspective views of a connection structure between a backlight sub-unit and a backlight driving circuit according to an exemplary embodiment of the present invention.
Figure 8B:
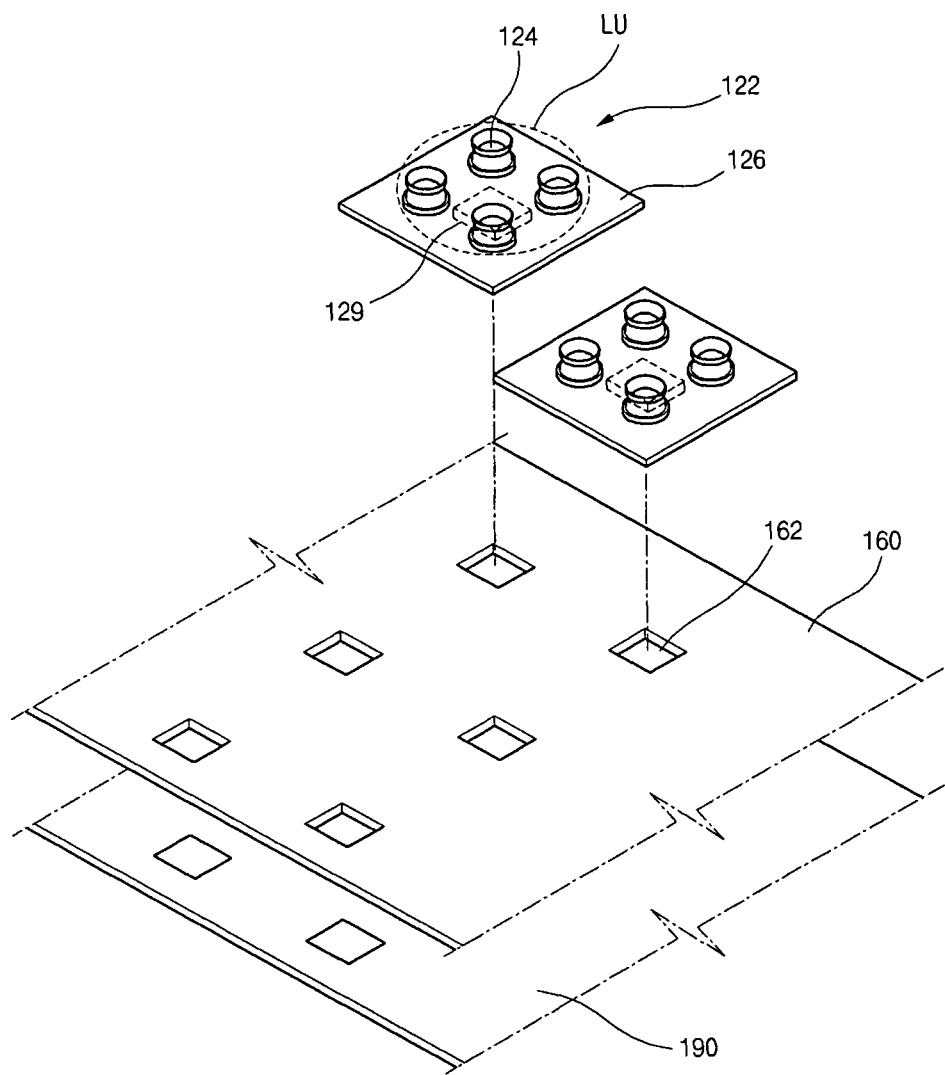

FIGS. 8A and 8B are perspective views showing a connection structure between a backlight sub-unit and a backlight driving circuit according to various exemplary embodiments of the present invention. As shown in FIG. 8A, the backlight sub-unit 122 includes the LED units LU each having the LEDs 124 configured to emit a predetermined color. At least one plug connector 127 is formed at a first side of the backlight sub-unit 122, and a socket connector 128 is formed at a second side adjacent to the first side of the backlight sub-unit 122. Specifically, the plug connector 127 and the socket connector 128 have protrusion and recessed shapes, respectively. Accordingly, the backlight sub-units 122 are connected to each other by inserting the plug connectors 127 to the respective socket connectors 128. The backlight sub-units 122 are connected to the backlight driving circuit 190 using a cable 200 that connects to one of the backlight sub-units 122.

Alternatively, as shown in FIG. 8B, a connector terminal 129 is disposed on a backside of the backlight sub-unit 122 to directly connect the backlight driving circuit 190. Accordingly, the bottom frame 160 has a connecting hole 162 exposing a portion of the backlight driving circuit 190 through the bottom frame 160 to connect to the connector terminal 129. In accordance with this exemplary embodiment, the connector terminal 129 disposed on the bottom of the backlight sub-unit 122 is exposed from the connecting hole 162 of the bottom frame 160 and connected to the backlight driving circuit 190 through soldering. However, other attachment configurations may be used without departing from the scope of the present invention.

Figure 9A:
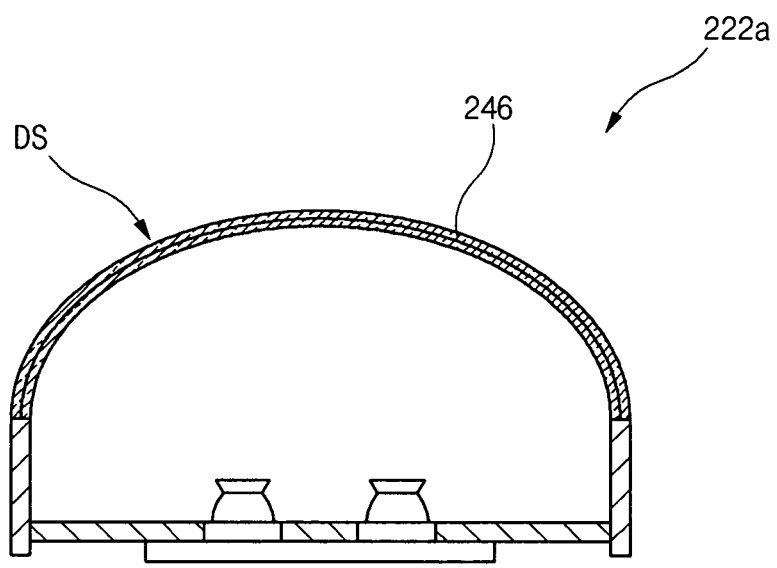
FIGS. 9A and 9B are schematic cross-sectional views of a backlight sub-unit according to another exemplary embodiment of the present invention.
Figure 9B:
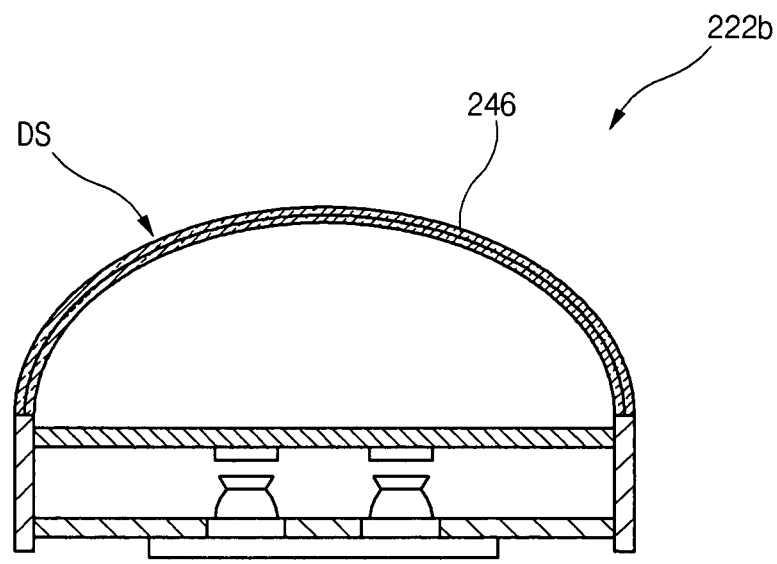

FIGS. 9A and 9B are schematic cross-sectional views of a backlight sub-unit according to another exemplary embodiment of the present invention. Similar structures of FIG. 9A corresponds to the exemplary backlight sub-unit of FIG. 4B while similar structures of FIG. 9B corresponds to the exemplary backlight sub-unit of FIG. 5B. As shown in FIGS. 9A and 9B, backlight sub-units 222a and 222b, respectively, include an optical sheet 246 having a non-planar shape, such as a dome shape DS. Accordingly, the image quality along the boundaries of the optical sheets 246 may be improved by the non-planar optical sheets, such as the dome shape DS.

The backlight assembly and the LCD module using the same have several advantages. First, each of the backlight sub-units provides uniform surface light of white color because the backlight sub-units are arranged in a matrix with an LED unit having at least one LED. Second, the backlight assembly according to the present invention provides uniform surface light for the entire surface area of the liquid crystal panel because each of the backlight sub-units emit uniform surface light. Third, since each of the backlight sub-units is modular, the cost and time for replacing and/or repairing the backlight sub-units are reduced. Fourth, the arrangement structure of the backlight sub-units may be varied since the backlight sub-units can be separated from each other. Fifth, each of the backlight sub-units can be driven by division driving method.

It will be apparent to those skilled in the art that various modifications and variations can be made in the backlight assembly of the present invention and the liquid crystal display module using the same without departing form the spirit or scope of the invention. Thus, it is intended that the present invention cover the modifications and variations of this invention provided they come within the scope of the appended claims and their equivalents.

What is claimed is:

1. A backlight assembly comprising at least one backlight sub-unit, the at least one backlight sub-unit including a light emitting diode (LED) unit that includes a plurality of LEDs that emit a predetermined color arranged in a predetermined pattern and a sidewall surrounding the LED unit, wherein the at least one backlight sub-unit includes a transparent window above the LED unit; and a plurality of diverters to reflect or diffuse a light from the plurality of LEDs under the transparent window facing the plurality of LEDs, wherein each of the plurality of diverters directly faces a corresponding one of the plurality of LEDs, wherein the plurality of diverters are spaced apart from each other under the transparent window, wherein the plurality of diverters are circular shape, and wherein an irradiation light of the plurality of LEDs is directly emitted to the plurality of diverters.

2. The backlight assembly according to claim 1, wherein the sidewall defines an emitting region by surrounding the LED unit.

3. The backlight assembly according to claim 1, wherein the at least one backlight sub-unit further include at least one optical sheet.

4. The backlight assembly according to claim 3, wherein the at least one optical sheet is disposed over the plurality of LED units.

5. The backlight assembly according to claim 4, wherein the transparent window is interposed between the LED unit and the at least one optical sheet.

6. The backlight assembly according to claim 3, wherein the at least one optical sheet has a non-planar shape with respect to the LED unit.

7. The backlight assembly according to claim 6, wherein the non-planar shape is a dome shape.

8. The backlight assembly according to claim 3, wherein the at least one optical sheet includes a diffusion sheet.

9. The backlight assembly according to claim 1, wherein the at least one backlight sub-unit includes:
a printed circuit board (PCB) on which the plurality of LEDs are mounted; and
a reflective sheet covering the PCB and having a plurality of through-holes that expose the plurality of LEDs.

10. The backlight assembly according to claim 9, wherein the PCB includes:
a plug connector at a first side of the PCB; and
a socket connector disposed at a second side of the PCB, wherein at least two of the backlight sub-units are connected via the plug and the socket connectors.

11. The backlight assembly according to claim 9, wherein a connector terminal is formed on a back surface of the PCB wherein the connector terminal is connected to a backlight driving circuit.

12. The backlight assembly according to claim 9, wherein the PCB includes metal core PCB.

13. The backlight assembly according to claim 1, wherein the sidewall is selected from one of a transparent material, an opaque reflective material, and a half-transparent diffusion material.

14. The backlight assembly according to claim 1, wherein the sidewall includes a lattice shape.

15. The backlight assembly according to claim 1, wherein the predetermined color is a white (W) color.

16. The backlight assembly according to claim 1, wherein the LED unit includes at least one white (W) LED.

17. The backlight assembly according to claim 1, wherein the LED unit includes at least one red (R) LED, at least one green (G) LED, and at least one blue (B) LED.

18. The backlight assembly according to claim 1, wherein the predetermined pattern includes one of a line shape, a triangular shape, and a square shape.

19. The backlight assembly according to claim 1, wherein the predetermined pattern includes at least three LEDs arranged in a shape and at least one LED disposed at a central position of the shape.

20. The backlight assembly according to claim 1, wherein the LED unit is independently detachable for replacement.

21. A backlight assembly, comprising:
a plurality of backlight sub-units, each of the plurality of backlight sub-unit including a light emitting diode (LED) unit, the LED unit including a plurality of LEDs emitting a predetermined color and a connector unit, wherein each of the plurality of backlight sub-units includes a transparent window above the LED unit; and
a plurality of diverters to reflect or diffuse a light from the plurality of LEDs under the transparent window facing the plurality of LEDs, wherein each of the plurality of diverter directly faces a corresponding one of the plurality of LEDs, wherein the plurality of diverters are spaced apart from each other under the transparent window, wherein the plurality of diverters are circular shape, and wherein an irradiation light of the plurality of LEDs is directly emitted to the plurality of diverters; and
a backlight driving circuit connected to at least one of the plurality of backlight sub-unit.

22. The backlight assembly according to claim 21, wherein the connector unit includes at least one plug connector and at least one socket connector.

23. The backlight assembly according to claim 21, wherein at least two of the plurality of backlight sub-units are connected via the connector units.

24. The backlight assembly according to claim 21, wherein the connector unit includes a connector terminal to connect directly to the backlight driving circuit, wherein the connector unit is formed on a back surface of the LED unit.

25. The backlight assembly according to claim 21, wherein the plurality of backlight sub-units are arranged in a matrix.

26. The backlight assembly according to claim 21, wherein the plurality of the backlight sub-units are divided into at least two groups and each group is driven by a common signal.

27. A liquid crystal display module, comprising:
a top frame;
a bottom frame;
a backlight assembly including a plurality of backlight sub-units arranged in a matrix shape, each of the plurality of backlight sub-units including a light emitting diode (LED) unit that includes a plurality of LEDs that emit a predetermined color arranged in a predetermined pattern, and a sidewall surrounding the LED unit, wherein each of the backlight sub-unit includes a transparent window above the LED unit; and a plurality of diverters to reflect or diffuse a light from the plurality of LEDs under the transparent window facing the plurality of LEDs, wherein each of the plurality of diverter directly faces a corresponding one of the plurality of LEDs, wherein the plurality of diverters are spaced apart from each other under the transparent window, wherein the plurality of diverters are circular shape, and wherein an irradiation light of the plurality of LEDs is directly emitted to the plurality of diverters;
a liquid crystal panel for displaying images;
a main frame interposed between the backlight assembly and the liquid crystal panel; and
a backlight driving circuit electrically connected to the plurality of the LED units.

28. The liquid crystal display module according to claim 27, wherein the LED unit is directly connected the backlight driving circuit.

29. The liquid crystal display module according to claim 27, wherein each of the backlight sub-unit includes:
a printed circuit board (PCB) on which the plurality of LEDs are mounted; and
a reflective sheet covering the PCB and having a plurality of through-holes exposing the plurality of LEDs.

30. The liquid crystal display module according to claim 29, wherein the PCB includes:
a plug connector at a first side of the PCB; and
a socket connector at a second side of the PCB, wherein at least two of the backlight sub-units are connected via the plug and the socket connectors.

31. The liquid crystal display module according to claim 29, wherein the PCB includes at least one connector terminal, the at least one connector terminal being formed on a back surface of the PCB.

32. The liquid crystal display module according to claim 31, wherein the backlight driving circuit is electrically connected to one of the plurality of backlight sub-units via the at least one connector terminal.

33. The liquid crystal display module according to claim 31, wherein the bottom frame has at least one opening to expose the at least one connector terminal configured to connect to the backlight driving circuit through the at least one opening.

34. The liquid crystal display module according to claim 29, wherein the PCB includes metal core PCB.

35. The liquid crystal display module according to claim 27, wherein the plurality of the backlight sub-units are divided into at least two groups and each group is driven by a common signal.

* * * * *